United States Patent
Proctor, Jr. et al.

(10) Patent No.: US 7,529,264 B2
(45) Date of Patent: *May 5, 2009

(54) USE OF ORTHOGONAL OR NEAR ORTHOGONAL CODES IN REVERSE LINK

(75) Inventors: James A. Proctor, Jr., Melbourne Beach, FL (US); Pertti O. Alapuranen, Indialantic, FL (US)

(73) Assignee: IPR Licensing, Inc., Wilmington, DE (US)

( * ) Notice: Subject to any disclaimer, the term of this patent is extended or adjusted under 35 U.S.C. 154(b) by 412 days.

This patent is subject to a terminal disclaimer.

(21) Appl. No.: 11/152,858

(22) Filed: Jun. 14, 2005

(65) Prior Publication Data

US 2005/0232140 A1 Oct. 20, 2005

Related U.S. Application Data

(63) Continuation of application No. 10/196,569, filed on Jul. 15, 2002, now Pat. No. 6,917,581.

(60) Provisional application No. 60/306,062, filed on Jul. 17, 2001.

(51) Int. Cl.
*H04J 11/00* (2006.01)

(52) U.S. Cl. ............... 370/441; 370/208; 370/335; 375/145

(58) Field of Classification Search ............... 370/441, 370/204, 208, 209, 335, 342, 203; 375/141, 375/145, 149

See application file for complete search history.

(56) References Cited

U.S. PATENT DOCUMENTS 5,414,728 A * 5/1995 Zehavi ............... 375/142
5,974,041 A * 10/1999 Kornfeld et al. ............... 370/342
6,044,074 A 3/2000 Zehavi et al.
6,091,760 A 7/2000 Giallorenzi et al.
6,240,292 B1 5/2001 Haberman et al.

(Continued)

FOREIGN PATENT DOCUMENTS

JP 5-110539 4/1993

(Continued)

OTHER PUBLICATIONS

Wong, T., "Doubly Spread DS-CDMA for Efficient Interference Cancellation", IEEE, Oct. 31, 1999, pp. 177-181, XP-000921930.

(Continued)

*Primary Examiner*—Ricky Ngo
*Assistant Examiner*—Dady Chery
(74) *Attorney, Agent, or Firm*—Volpe and Koenig, P.C.

(57) ABSTRACT

A technique for allowing a first and second group of users to share access to a communication channel such as a wireless radio channel is disclosed. The first group of users can be a group of legacy users such as those that use digital CDMA cellular telephone equipment based on the IS-95 standard. The second group of users can be a group of web surfers that code their transmissions using one of multiple formats. The first group of users can share one modulation structure such as, on a reverse link, using unique phase offsets of a common pseudorandom noise (PN) code. The second group of users can share another modulation structure, but in a manner that is consistent and compatible with the users of the first group. Specifically, the users of the second group may all use the same PN code and code phase offset. Each channel used by the second group of users can be uniquely identified by a corresponding unique orthogonal code.

13 Claims, 3 Drawing Sheets

U.S. PATENT DOCUMENTS

| | | | |
|---|---|---|---|
| 6,249,517 B1 * | 6/2001 | Roh et al. | 370/342 |
| 6,266,363 B1 | 7/2001 | Hiramatsu | |
| 6,456,612 B1 | 9/2002 | Kim et al. | |
| 6,483,828 B1 * | 11/2002 | Balachandran et al. | 370/342 |
| 6,493,376 B1 | 12/2002 | Harms et al. | |
| 6,563,808 B1 | 5/2003 | Cox et al. | |
| 6,574,211 B2 | 6/2003 | Padovani et al. | |
| 6,590,889 B1 | 7/2003 | Preuss et al. | |
| 6,647,077 B1 * | 11/2003 | Shan et al. | 375/346 |
| 6,778,507 B1 * | 8/2004 | Jalali | 370/317 |
| 2002/0009068 A1 | 1/2002 | Proctor, Jr. et al. | |
| 2002/0054611 A1 * | 5/2002 | Seta | 370/503 |
| 2002/0064182 A1 | 5/2002 | Hoffman | |

FOREIGN PATENT DOCUMENTS

| | | |
|---|---|---|
| JP | 10-056420 | 2/1998 |
| JP | 11-275059 | 10/1999 |
| JP | 11-317693 | 11/1999 |
| JP | 11-317979 | 11/1999 |
| WO | 92/00639 | 1/1992 |
| WO | 00/30390 | 5/2000 |
| WO | 01/26246 | 4/2001 |
| WO | 01/33871 | 5/2001 |
| WO | 02/09320 | 1/2002 |
| WO | WO 02/09320 A2 | 1/2002 |

OTHER PUBLICATIONS

Wong, T., "Doubly Spread DS-CDMA for Efficient Cancellation," IEEE, Oct. 31, 1999, pp. 177-181.

Telecommunications Industry Association, "TIA/EIA Standard, Mobile Station-Base Station Compatibility Standard for Wideband Spread Spectrum Cellular Systems, TIA/EIA-95B (Upgrade and Revision of TIA/EIA-95A)," (Mar. 1999).

Third Generation Partnership Project 2, "Physical Layer Standard for CDMA2000 Spread Spectrum Systems," 3 GPP2 C.S0002-0 V 1.0 (Jul. 1999).

* cited by examiner

USE OF ORTHOGONAL OR NEAR ORTHOGONAL CODES IN REVERSE LINK

RELATED APPLICATION(S)

This application is a continuation of U.S. application Ser. No. 10/196,569, filed Jul. 15, 2002, now U.S. Pat. No. 6,917,581, which claims the benefit of U.S. Provisional Application No. 60/306,062, filed on Jul. 17, 2001, the entire teachings of which is incorporated herein by reference.

BACKGROUND OF THE INVENTION

The last twenty years have seen unprecedented growth in both the type and demand for wireless communication services. Wireless voice communication services, including cellular telephone, Personal Communication Services (PCS), and similar systems now provide nearly ubiquitous coverage. The infrastructure for such networks has been build-out to the point where most residents of the United States, Europe, and other industrialized regions of the world have not just one, but multiple service providers from which to choose.

Continued growth in the electronics and computer industries increasingly contributes to demand for access to the Internet and the myriad of services and features that it provides. This proliferation in the use of computing equipment, especially that of the portable variety, including laptop computers, handheld Personal Digital Assistants (PDAs), Internet-enabled cellular telephones and like devices, has resulted in a corresponding increase in the need for wireless data access.

While the cellular telephone and PCS networks are widely deployed, these systems were not originally intended for carrying data traffic. Instead, these networks were designed to efficiently support continuous analog signals as compared to the burst mode digital communication protocols needed for Internet communications. Consider also that voice communication is adequate with a communication channel bandwidth of approximately 3 kilohertz (kHz). However, it is generally accepted that for effective Internet communication, such as for Web browsing, a data rate of at least 56 kilobits per second (kbps) or higher is required.

In addition, the very nature of the data traffic itself is different from the nature of voice communication. Voice requires a continuous duplex connection, that is, the user at one end of a connection expects to be able to transmit and receive to the user at the other end of a connection continuously, while at the same time the user at the other end is also able to transmit and receive. However, access to Web pages over the Internet is, in general, very burst oriented. Typically, the user of a remote client computer specifies the address of computer files such as on a Web server. This request is then formatted as a relatively short data message, typically less than a 1000 bytes in length. The other end of the connection, such as at a Web server in the network, then replies with the requested data file which may be from 10 kilobytes to several megabytes of text, image, audio, or video data. Because of delays inherent in the Internet itself, users often expect delays of at least several seconds or more before the requested content begins to be delivered to them. And then once that content is delivered, the user may spend several seconds or even minutes reviewing, reading the contents of the page before specifying the next page to be downloaded.

Furthermore, voice networks were built to support high mobility usage; that is, extreme lengths were taken to support highway speed type mobility to maintain connections as the users of voice based cellular and PCS networks travel at high speeds along a highway. However, the typical user of a laptop computer is relatively stationary, such as sitting at a desk. Thus, the cell-to-cell high speed mobility considered critical for wireless voice networks is typically not required for supporting data access.

SUMMARY OF THE INVENTION

A forward link of a CDMA (Code Division Multiple Access) communication system typically incorporates orthogonal codes to define channels for transmitting information from a single source to multiple receivers. For example, a base station can simultaneously transmit over multiple forward link channels defined by orthogonal codes because such transmissions over multiple channels can be precisely controlled so that the transmitted signals are orthogonal to each other. Generally, synchronization on the forward link is not an issue because a single source transmits multiple signals to multiple users.

In a reverse link, however, orthogonal codes are not used to transmit from a remote device to the base station because of the unique delay profile associated with each remote device for transmissions back to the base station. More specifically, a signal transmitted by another remote device farther away typically takes longer to reach the base station than a transmission by a remote device closer to the base station. Thus, orthogonality of channels can be lost when these signals are not received so that they are synchronized with respect to each other at the base station.

Current CDMA standards such as IS-2000 and IS-95 do not attempt to achieve orthogonality between separate remotely transmitting devices. Instead, the standards utilize a chip level scrambling code incorporating unique shifts in a long code to distinguish which of multiple reverse link access terminals is transmitting to the base station. According to this scheme, the channels can not be defined so that they are orthogonal with respect to each other.

One method for synchronizing reverse link channels is described in the related applications as mentioned above. Based on such methods, reverse link channels from multiple individual remote devices can be defined by orthogonal codes to support higher reverse link data rates. This is due to reasonably precise timing alignment between the field units and corresponding base station as a result of feedback messages. Accordingly, multiple channels defined by orthogonal codes can appear orthogonal to each other at the base station when transmissions from the remote devices are adjusted to account for their delay profile and corresponding multi-path distortion profile. Reverse channels can therefore be defined by scrambling each transmitted symbol with orthogonal sequences or codes such as Walsh codes.

One aspect of the present invention involves retrofitting certain components of the existing wireless infrastructure to more efficiently accommodate wireless data. The additional functionality implemented for a new class of users who are high data rate, but low mobility can be backwards compatible with existing functionality for users who are low data rate, high mobility. This would permit use of the same frequency allocation plans, base station antenna, build out sites, and other aspects of the existing voice network infrastructure to provide the new high speed data service.

It can particularly advantageous to support as high a data rate as possible on the reverse link of such a network that is carrying data on the reverse link, e.g., from the remote unit to the base station. Consider that existing digital cellular standards such as the IS-95 Code Division Multiple Access (CDMA) specify the use of different code sequences in a forward link direction in order to maintain minimum interference between channels. Specifically, such a system employs orthogonal codes on the forward link, which defines individual logical channels. However, the optimum operation of such a system requires all such codes to be time aligned to a specific boundary to maintain orthogonality at the receiver.

This is not a particular concern in a forward link direction since all transmissions originate from the same location, i.e., from a base station location. However, currently, digital cellular CDMA standards do not attempt to use or require orthogonality between channels in reverse link direction. It is generally assumed that it is too difficult to synchronize transmissions originating from remote units located in different locations and at potentially quite different distances from the base station. Instead, these systems typically use a chip level scrambling code with unique shifts of this long pseudorandom code to distinguish the individual reverse link channels. Use of this scrambling code, however, precludes of different users' transmissions being orthogonal to one another.

Another aspect of the present invention is a system supporting communication among members of a first group of users and a second group of users. The first group of users, which may be legacy users of a digital Code Division Multiple Access (CDMA) cellular telephone system, can encode their transmissions with a common first code. Such first group of users are uniquely identifiable by providing a unique code phase offset for each user. The second group of users, who may be users of a high speed data service, can encode their transmissions using the same code and one of the code phase offsets of that code. That is, a unique phase shifted long code can be used for spreading. Each of the users of the second group can further encode their transmissions with an additional code. This additional code can be unique for each of the users of the second group. This permits the transmissions of the second group of users to be orthogonal to each other while maintaining the appearance of collectively being a single user of the first group.

A chip rate at which the orthogonal code is applied to define a channel can be equal to a chip rate at which the unique phase shifted long code is applied.

In other applications, however, it can be advantageous to apply the orthogonal code at a lower chipping rate than that of the unique phase shifted long code. To increase a bit rate, higher order modulation techniques can be employed. For example, QPSK, 8-psk, 16-psk and higher order modulation can be used to transmit data information.

In a specific application, adaptive modulation techniques can be used to transmit data information. For example, a modulation rate can be selected to optimize data throughput of the system.

The code assigned to the first group of users may be a common chipping rate, pseudorandom code. The code assigned to the second group of terminals may be a set of unique orthogonal codes such as Walsh codes. The individual members of the first group of terminals may be distinguished by scrambling codes that have unique phase offsets of a selected longer pseudorandom noise sequence.

Certain steps can be taken to ensure proper operation of the signaling among the second group of users or so-called "heartbeat." Specifically, a common code channel may be dedicated for use as a synchronization channel. This permits the maintenance of proper timing of the transmissions of the second group of terminals if, for example, the coding scheme is implemented in a reverse link direction. In other words, a feedback loop can be established for each of multiple remote devices so that their simultaneous transmissions are synchronously received at the base station. A message in the Feedback channel to a particular field unit can indicate whether to advance or retard its timing for future communications so they are received at the proper time at base station.

Users of the second group can be allocated specific time slots in which to transmit and therefore maintain the orthogonality through the use of time division multiple access. Again, the second group of users can collectively appear as a single user to the transmissions of the users in the first group.

Another aspect of the present invention involves providing a CDMA communication system in which user channels in the reverse link are defined by orthogonal codes and the system does not include legacy users. In such a system, it would not be necessary to address backwards compatibility issues associated with legacy users.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF A PREFERRED EMBODIMENT

Figure 1:
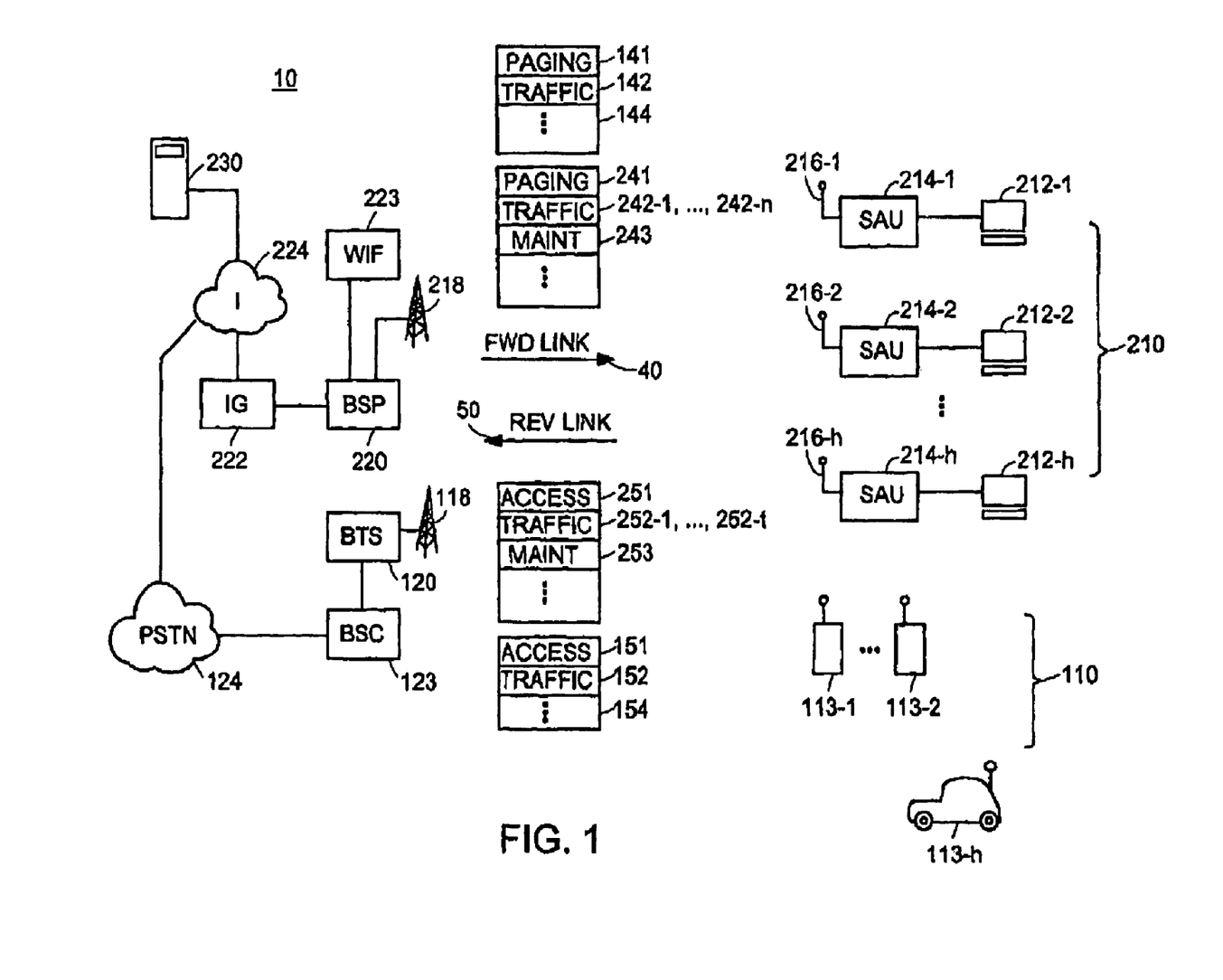
FIG. 1 is a block diagram of a system that employs two different types of channel encoding according to certain principles of the invention.

FIG. 1 is a block diagram of a Code Division Multiple Access (CDMA) communication system 10 that makes use of a signal encoding scheme in which a first class of logical channels are assigned unique long codes with different code phase offsets, and a second class of logical channels are provided by using a common code and common code phase offset, combined with an additional coding process using a unique orthogonal code for each channel. In one embodiment, however, communication system 10 does not include legacy users.

In the following detailed description of a preferred embodiment, the communication system 10 is described such that the shared channel resource is a wireless or radio channel. However, it should be understood that the techniques described here can be applied to implement shared access to other types of media such as telephone connections, computer network connections, cable connections, and other physical media to which access is granted on a demand driven basis.

The system 10 supports wireless communication for a first group of users 110 as well as a second group of users 210. The first group of users 110 are typically legacy users of cellular telephone equipment such as wireless handsets 113-1, 113-2, and/or cellular mobile telephones 113-*h* installed in vehicles. This first group of users 110 principally use the network in a voice mode whereby their communications are encoded as continuous transmissions. In a preferred embodiment, these users' transmissions are forwarded from the subscriber units 113 through forward link 40 radio channels and reverse link 50 radio channels. Their signals are managed at a central location that includes a base station antenna 118, base transceiver station (BTS) 120, base station controller (BSC) 123. The first group of users 110 are therefore typically engaged in voice conversations using the mobile subscriber units 113, BTS 120, and BSC 123 to connect telephone connections through the Public Switch Telephone Network (PSTN) 124.

The forward link 40 in use by the first group of users may be encoded according to well known digital cellular standards such as this Code Division Multiple Access (CDMA) standard defined in IS-95B specified by the Telecommunications Industry Association (TIA). This forward link 40 includes at least a paging channel 141 and traffic channel 142, as well as other logical channels 144. These forward link 40 legacy channels 141, 142, 144 are defined in such a system by using orthogonally coded channels. These first group of users 110 also encode their transmissions over the reverse link 50 in accordance with the IS-95B standard. They therefore make use of several logical channels in a reverse link 50 direction, including an access channel 151, traffic channel 152, and other logical channels 154. In this reverse link 50, the first group of users 110 typically encode the signals with a common long code using different code phase offsets. The manner of encoding signals for the legacy users 110 on the reverse link 50 is also well known in the art.

The communication system 10 also includes a second group of users 210. This second group of users 210 are typically users who require high speed wireless data services. Their system components include a number of remotely located Personal Computer (PC) devices 212-1, 212-2, ... 212-h, ... 212-1, corresponding remote Subscriber Access Units (SAUs) 214-1, 214-2, ... 214-h, ... 214-1, and associated antennas 216-1, 216-2, ... 216-h, ... 216-1. Centrally located equipment includes a base station antenna 218, and a Base Station Processor (BSP) 220. The BSP 220 provides connections to and from an Internet gateway 222, which in turn provides access to a data network such as the Internet 224, and network file server 230 connected to the network 224.

The PCs 212 may transmit data to and receive data from network server 230 through bi-directional wireless connections implemented over the forward link 40 and reverse link 50 used by the legacy users 110. It should be understood that in a point to multi-point multiple access wireless communication system 10 as shown, a given base station processor 220 supports communication with a number of different active subscriber access units 214 in a manner which is similar to a cellular telephone communication network.

In the present scenario, the radio frequencies allocated for use by the first group 110 are the same as those allocated for use by the second group 210. The present invention is specifically concerned with how to permit a different encoding structure to be used by the second group 210 while creating minimal interference to the first group 110.

The PCs 212 are typically laptop computers 212-1, handheld units 212-h, Internet-enabled cellular telephones or Personal Digital Assistant (PDA) type computing devices. The PCs 212 are each connected to a respective SAU 214 through a suitable wired connection such as an Ethernet-type connection.

An SAU 214 permits its associated PC 212 to be connected to the network file server 230 through the BSP 220, gateway 222 and network 224. In the reverse link direction, that is, for data traffic traveling from the PC 212 towards the server 230, the PC 212 provides an Internet Protocol (IP) level packet to the SAU 214. The SAU 214 then encapsulates the wired framing (i.e., Ethernet framing) with appropriate wireless connection framing and encoding. The appropriately formatted wireless data packet then travels over one of the radio channels that comprise the reverse link 50 through the antennas 216 and 218. At the central base station location, the BSP 220 then extracts the radio link framing, reformatting the packet in IP form and forwards it through the Internet gateway 222. The packet is then routed through any number and/or any type of TCP/IP networks, such as the Internet 224, to its ultimate destination, such as the network file server 230.

Data may also be transmitted from the network file server 230 to the PCs 212 in a forward link 40 direction. In this instance, an Internet Protocol (IP) packet originating at the file server 230 travels through the Internet 224 through the Internet gateway 222 arriving at the BSP 220. Appropriate wireless protocol framing and encoding is then added to the IP packet. The packet then travels through the antenna 218 and 216 to the intended receiver SAU 214. The receiving SAU 214 decodes the wireless packet formatting, and forwards the packet to the intended PC 212 which performs the EP layer processing.

A given PC 212 and the file server 230 can therefore be viewed as the end points of a duplex connection at the IP level. Once a connection is established, a user at the PC 212 may therefore transmit data to and receive data from the file server 230.

From the perspective of the second group of users 210, the reverse link 50 actually consists of a number of different types of logical and/or physical radio channels including an access channel 251, multiple traffic channels 252-1, ... 252-t, and a maintenance channel 53. The reverse link access channel 251 is used by the SAUs 240 to send messages to the BSP 220 to request that traffic channels be granted to them. The assigned traffic channels 252 then carry payload data from the SAU 214 to the BSP 220. It should be understood that a given IP layer connection may actually have more than one traffic channel 252 assigned to it. In addition, a maintenance channel 253 may carry information such as synchronization and power control messages to further support transmission of information over the reverse link 50.

Similarly, the second group of users have a forward link 40 that includes a paging channel 241, multiple traffic channels 242-1 ... 242-t, and maintenance channel 243. The paging channel 241 is used by the BSP 220 to not only inform the SAU 214 that forward link traffic channels 252 have been allocated to it, but also to inform the SAU 214 of allocated traffic channels 252 in the reverse link direction. Traffic channels 242-1 ... 242-t on the forward link 40 are then used to carry payload data information from the BSP 220 to the SAUs 214. Additionally, maintenance channels 243 carry synchronization and power control information on the forward link 40 from the base station processor 220 to the SAUs 214. It should be understood that there are typically many more traffic channels 241 than paging channels 241 or maintenance channels 243. In the preferred embodiment, the logical forward link channels 241, 242, and 243 and 251, 252, and 253 are defined by assigning each channel a pseudorandom noise (PN) channel code. The system 10 is therefore a so-called Code Division Multiple Access (CDMA) system in which multiple coded channels may use the same radio frequency (RF) channel. The logical or codes channels may also be further divided or assigned among multiple active SAUs 214.

The sequence of signal processing operations is typically performed to encode the respective reverse link 50 logical channels 51, 52, and 53. In the reverse link direction, the transmitter is one of the SAUs 214 and the receiver is the Base Station Processor (BSP) 220. The preferred embodiment of the invention is implemented in an environment where legacy users of a CDMA digital cellular telephone system such as one operating in accordance with the IS-95B standard are also present on the reverse link 50. In an IS-95B system, reverse link CDMA channel signals are identified by assigning non-orthogonal pseudorandom noise (PN) codes.

Figure 2:
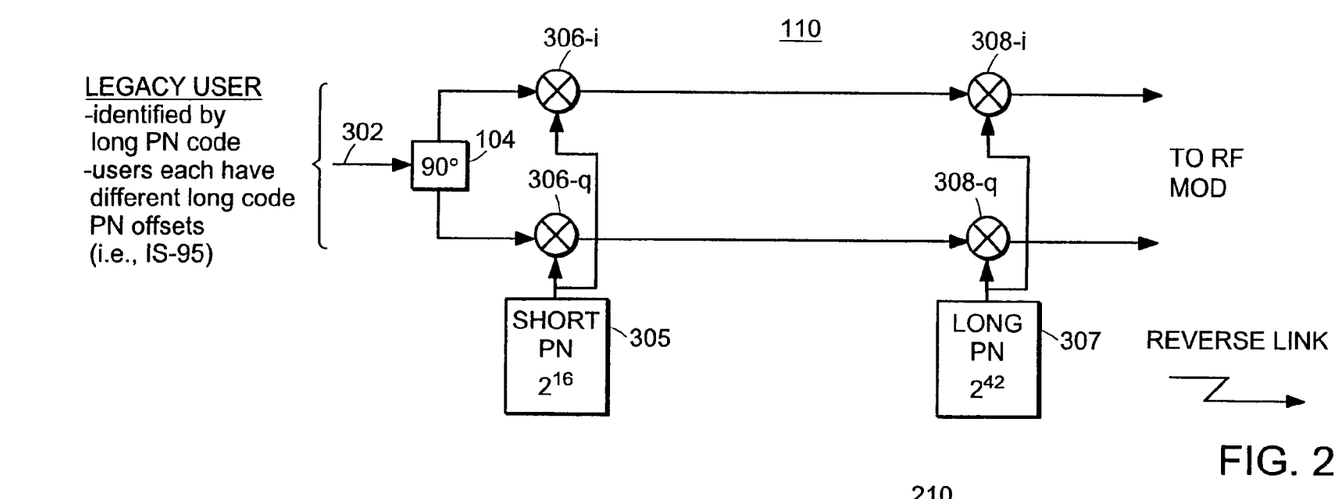
FIG. 2 is a more detailed diagram of a channel encoding process for a first class of users according to certain principles of the present invention.

Turning attention now to FIG. 2, the channel encoding process for the first group of legacy users 110 will be described in greater detail. This first class of users includes, for example, digital CDMA cellular telephone system users that encode signals according to the IS-95B standard as mentioned above. The individual channels are therefore identified by modulating the input digitized voice signal by a pseudorandom noise (PN) code sequence for each channel. Specifically, the channel encoding process takes an input digital signal 302 that represents the information to be transmitted. A quadrature modulator 304 provides an in-phase (i) and quadrature (q) signal path to a pair of multipliers 306-$i$ and 306-$q$. A short pseudorandom noise (PN) code generator 305 provides a short (in this case a $2^{15}-1$ or 32767 bit) length code used for spectrum spreading purposes. The short code typically therefore is the same code for each of the logical channels for the first group 110.

A second code modulation step is applied to the (i) and (q) signal paths by multiplying the two signal paths with an additional long PN code. This is accomplished by the long code generator 307 and the long code multipliers 308-$i$ and 308-$q$. The long code serves to uniquely identify each user on the reverse link 50. The long code may be a very long code, which, for example, only repeats every $2^{42}-1$ bits. The long code is applied at the short code chipping rate, e.g., one bit of the long code is applied to each bit output by the short code modulation process, so that further spectrum spreading does not occur.

Individual users are identified by applying different phase offsets of the PN long code to each user.

It should be understood that other synchronization steps need not be taken for the first group of users 110. Specifically, these transmissions on the reverse link 50 are designed to be asynchronous and therefore are not necessarily perfectly orthogonal.

Figure 3:
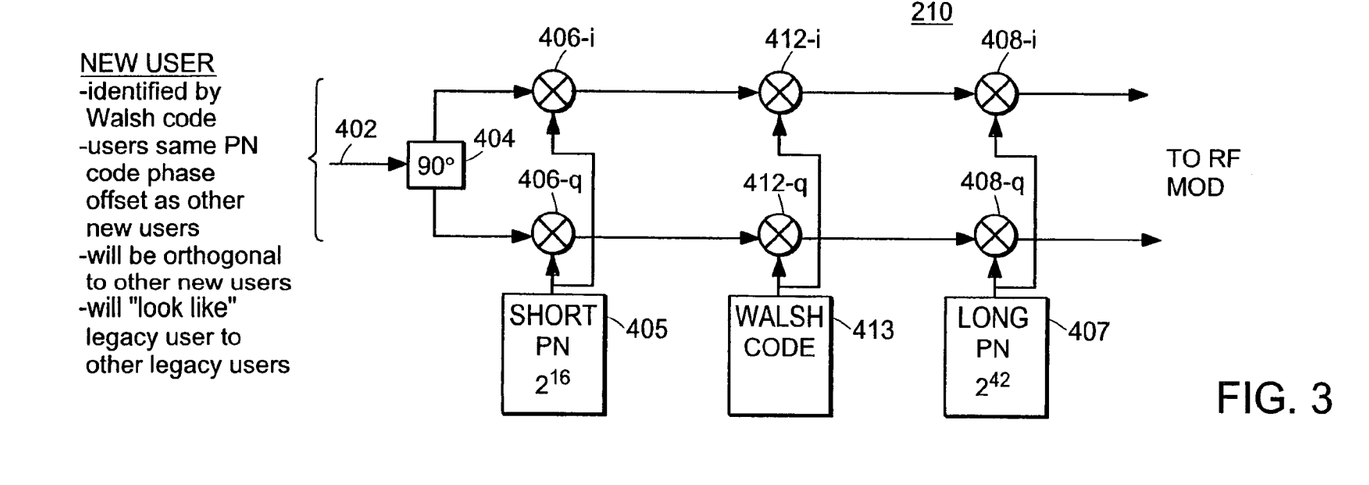
FIG. 3 is a more detailed diagram of a channel encoding process for a second class of users according to certain principles of the present invention.

FIG. 3 is a more detailed view of the channel encoding process for the second group of users 210. This second group 210, for example, includes wireless data users that encode signals according to a format optimized for data transmission.

The individual channels are identified by modulating the input data by a pseudorandom noise (PN) code sequence that is the same code sequence used for the first group of users 110. However, as will be understood shortly, the channels in the second group 210 are uniquely identified by specific orthogonal codes such as Walsh codes. Specifically, the channel encoding process for this second group of users 210 takes an input digital signal 402 and applies a number of codes as generated by a short code generator 405, Walsh code generator 413, and long code generator 407.

As a first step, a quadrature modulator 404 provides an in-phase (i) and quadrature (q) signal path to a first pair of multipliers 406-$i$ and 406-$q$. The short pseudorandom noise (PN) code generator 405 provides a short, in this case, a $2^{15}$ length code used for spectrum spreading purposes. This short code therefore is the same as the short PN code used for each of the channels in the first group 110.

A second step in the process is to apply an orthogonal code such as generated by the Walsh code generator 413. This is accomplished by the multipliers 412-$i$ and 412-$q$ impressing the orthogonal code on each of the in-phase and quadrature signal paths. The orthogonal code assigned to each logical channel is different, and uniquely identifies such channels.

In a final step of the process, a second pseudorandom noise (PN) long code is applied to the (i) and (q) signal paths. The long code generator 407 thus forwards the long code to a respective one of the in-phase 408-$i$ and quadrature 408-$q$ multipliers. This long code does not uniquely identify each user in the second group 210. Specifically, this code may be one of the very same long codes that are used in the first group that uniquely identify their first group of users 110. Thus, for example, it is applied in the same manner as a short code chipping rate code so that one bit of the long code is applied to each bit output by the short code modulation process. In this manner, all of the users in the second group 210 appears as a single legacy user of the first group 110. However, the users of the second group 210 may be uniquely identified given that they have been assigned unique orthogonal Walsh codes.

As the implementation in the preferred embodiment is on a reverse link 50, additional information must be provided in order to maintain orthogonality among the various users in the second group 210. Specifically, a maintenance channel 243 is therefore included in the forward link 40. This maintenance or "heartbeat" channel provides synchronization information and/or other timing signals so that the remote units 214 may synchronize their transmissions appropriately. The maintenance channel may be time slotted. For more details of the formatting of this forward link maintenance channel 243, reference can be had to a co-pending U.S. patent application Ser. No. 09/775,305 filed Feb. 1, 2001 entitled "MAINTENANCE LINK USING ACTIVE/STANDBY REQUEST CHANNELS," which is hereby incorporated by reference in its entirety. This application is related to U.S. application Ser. No. 09/778,474, filed on Feb. 7, 2001 , and U.S. application Ser. No. 09/775,305, filed on Feb. 1, 2001, the teachings of which are also incorporated herein by reference.

It should be understood that certain infrastructure may therefore be shared by both the second group of users 210 and first group of users 110. For example, the antennas 218 and 118 although shown as separate base station antennas in FIG. 1 may indeed be a shared antenna. Likewise, the location for the antennas may therefore be the same. This permits the second group of users 210 to share equipment and physical build-out locations already in place and in use by the legacy users 110. This greatly simplifies the deployment of wireless infrastructure for this new group of users 210, for example, new locations and new antenna sites need not be built out.

Figure 4:
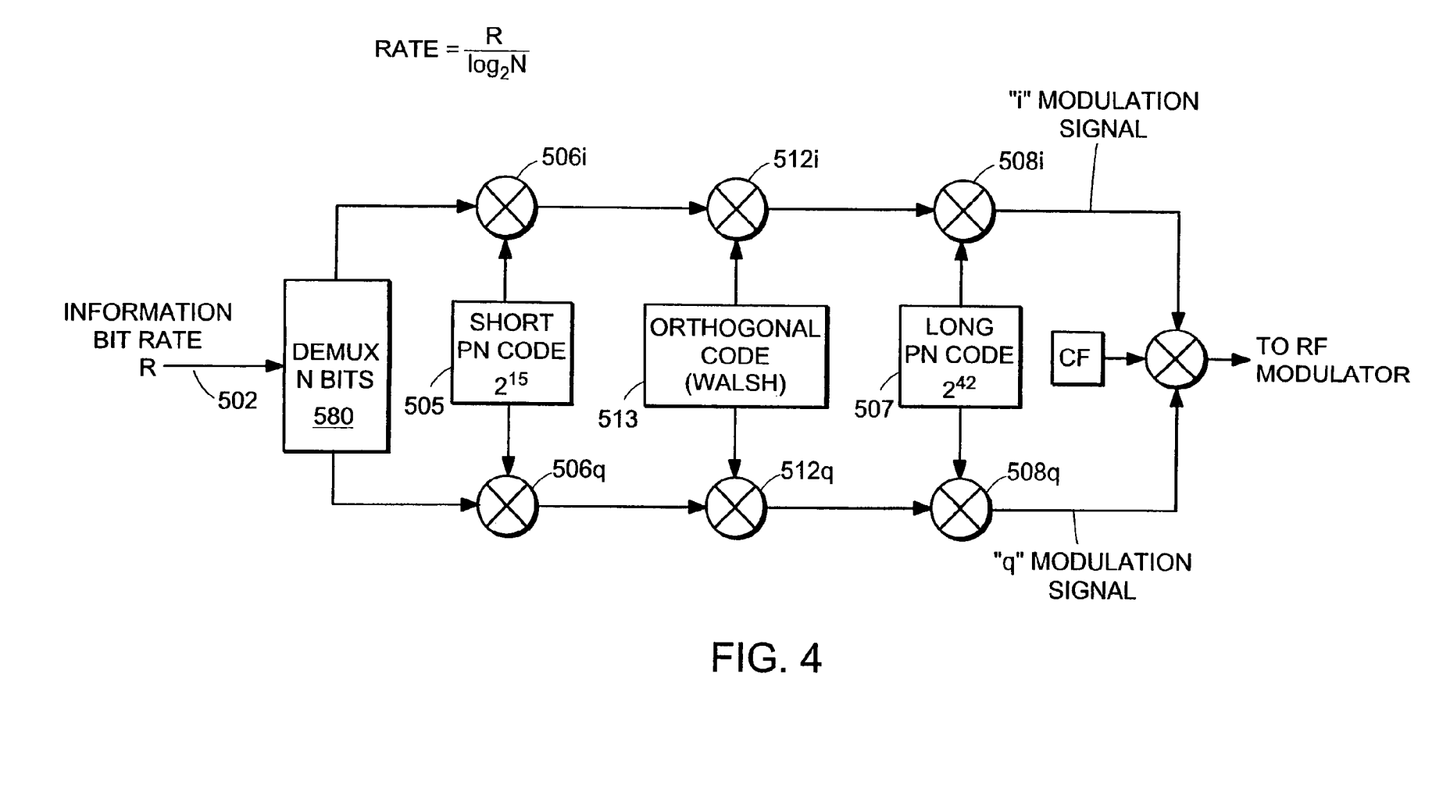
FIG. 4 is a block diagram of a channel spreading process for transmitting from a remote device to a base station according to certain principles of the present invention.

FIG. 4 is a block diagram illustrating a communication system according to certain principles of the present invention. As previously discussed, such a system may or may not include legacy users. Generally, the principles are similar to those as discussed in FIG. 3.

As shown in FIG. 4, bit information 502 is fed into demultiplexer/modulator 580 where the bits are demultiplexed into modulation symbols to generate an I and Q modulation signal. Generally, N bits are mapped based upon the order of modulation applied. For example, the following chart illustrates different modulation rates that can be used for transmitting information over an RF signal:

| Order N | Input Rate R | Bits/Symbol | Output Rate |
| --- | --- | --- | --- |
| BPSK - (2) | R | 1 | R |
| QPSK - (4) | R | 2 | R/2 |

-continued

| Order N | Input Rate R | Bits/Symbol | Output Rate |
|---|---|---|---|
| 8-PSK - (8) | R | 3 | R/3 |
| 16-QAM (16) | R | 4 | R/4 |
| . | . | . | . |
| . | . | . | . |
| . | . | . | . |

According to the spreading process, the Output Rate=R/(log$_2$N).

The individual channels are identified by modulating the input data by a pseudorandom noise (PN) code sequence such as a short code and long code. However, as will be understood shortly, the channels can be uniquely identified by specific orthogonal codes such as Walsh codes. Near orthogonal codes also can be used to define channels.

Specifically, a channel encoding process can involve demultiplexing a digital signal 502 and applying a number of codes as generated by short code generator 505, Walsh code generator 513, and long code generator 507. Generally, these spreading techniques can be applied in any order although a specific order is shown in FIG. 4.

As a first step, modulator 580 provides an in-phase (i) and quadrature (q) signal path to a first pair of multipliers 506-$i$ and 506-$q$. Short pseudorandom noise (PN) code generator 505 provides a short code, in this case, a $2^{15}$ length code used for spectrum spreading purposes. This short code can be used for each of multiple channels.

A second step in the process is to apply an orthogonal code such as generated by the Walsh code generator 513. This can be accomplished by multipliers 512-$i$ and 512-$q$ impressing an orthogonal code on each of the in-phase and quadrature signal paths. An orthogonal code assigned to each logical channel can be different to uniquely identify separate channels.

In a final step of the process, a second pseudorandom noise (PN) long code can be applied to the (i) and (q) signal paths. Long code generator 507 thus forwards the long code to a respective one of the in-phase 508-$i$ and quadrature 508-$q$ multipliers. Typically, this long code does not uniquely identify each channel.

Depending on the application, the order of spreading can vary. For example, the spreading codes such as the short and long codes can be applied sequentially and in any order. Typically, the code rate is set at the RF (Radio Frequency) bandwidth such as 1.2288 e+6 chips per second.

Although the chipping rate of the codes may vary, in one application the chipping rate of the orthogonal code is less than the chipping rate of the short or long PN spreading code. This relaxes timing alignment requirements of the communication system and reduces the negative impact of multi-path distortion associated with each of multiple users transmitting over channels defined by orthogonal codes. In other words, Orthogonal Channel Noise (OCN) can be reduced by adjusting relative rates of the spreading code and orthogonal codes to each other.

Typically, lower chipping rates of the orthogonal code will reduce a data transmission rate for a channel. However, higher order modulation can be utilized to increase the data rate as previously discussed. See the chart above. Adaptive modulation techniques can be employed to optimally transmit for a particular application. In other words, feedback information can indicate an optimal rate at which data will be transmitted on a particular channel. Thus, an optimal modulation rate can be selected for transmitting over a particular channel. When higher throughput is necessary, increased bit rates can be achieved using higher modulation rates. This is particularly advantageous in dynamic environments where users require high speed data throughput capability. Each of multiple orthogonal channels can utilize different modulation rates for transmitting data.

Although the previously discussed concepts are discussed for use in a reverse link, they also can be advantageously applied to forward link channels of a CDMA communication system.

Generally, the choice of an orthogonal code rate is independent of the choice of the order of modulation used. The following chart illustrates potential settings for relative code rates:

| Spreading Code Rate | Orthogonal Code Rate | Symbol Rate |
|---|---|---|
| R = 1.2288 e6 | R | R |
| R | R/2 | R/2 |
| R | R/3 | R/3 |
| R | R/4 | R/4 |

Terminal devices transmitting data over one or multiple channels defined by orthogonal codes can also utilize Forward Error Correction (FEC) codes to ensure data reliability at a receiver. Similar to the adaptive modulation techniques as discussed, an FEC codes can be adapted for use in a particular channel. That is, an FEC code rate or modulation rate can be selected based on a C/I measured for a particular channel at a receiver such as a base station. Feedback messages can be transmitted from the base station to a remote device regarding how to set a modulation rate and which of multiple FEC codes shall be used for transmitting over a particular channel.

What is claimed is:

1. A method for code division multiple access communication assigning to a first group of terminals a first pseudorandom noise code, each user of the first group of terminals being uniquely identifiable by a unique code phase offset, the first pseudorandom noise code being assigned to the first group of terminals by a first modulator;

assigning to a second group of terminals the first pseudorandom noise code, with each user of the second group of terminals also being assigned a common phase offset of the first pseudorandom noise code, the first pseudorandom noise code and common phase offset being assigned to the second group of terminals by a second modulator; and assigning to each terminal of the second group of terminals a unique spreading code, the unique spreading code having a chipping rate less than a chipping rate of the first pseudorandom noise code, the spreading code being one of an orthogonal spreading code or a near-orthogonal spreading code, the spreading code being assigned by a third modulator.

2. The method according to claim 1, wherein the spreading code is a Walsh code.

3. The method according to claim 1, wherein the spreading code uniquely defines a separate logical channel.

4. The method according to claim 1 further comprising:

assigning to each terminal of the second group of terminals a feedback channel that enables each terminal to receive information, thereby enabling the terminal to advance or retard its timing for future communications.

5. The method according to claim 4, further comprising:
receiving at the terminal, through the feedback channel, at least one of channel noise information or synchronization information.

6. The method according to claim 1, wherein the spreading code chipping rate of a terminal is proportional to a modulation symbol rate of the terminal.

7. The method according to claim 6, further comprising:
using adaptive modulation at the terminal, wherein the spreading code chipping rate matches the adaptive modulation symbol rate.

8. The method according to claim 7, wherein the terminal modulation rate is determined based on a C/I measurement received at the terminal in a feedback message.

9. The method according to claim 7, wherein the terminal forward error correction rate is determined based on a C/I measurement received at the terminal in a feedback message.

10. The method according to claim 1, further comprising:
assigning one or more additional pseudorandom noise spreading codes to a terminal.

11. The method according to claim 10, wherein the spreading code has a chipping rate that is less than a chipping rate of one or more of the additional pseudorandom noise spreading codes.

12. The method according to claim 1, wherein the method is applied to at least one of a forward link or reverse link of a CDMA network.

13. An apparatus configured to support code division multiple access communications comprising:
a first modulator configured to assign to a first group of terminals a first pseudorandom noise code, each user, of the first group of terminals being uniquely identifiable by a unique code phase offset;
a second modulator configured to assign to a second group of terminals the first pseudorandom noise code, with each terminal of the second group of terminals using a common phase offset of the first pseudorandom noise code; and
a third modulator configured to assign to each terminal of the second group of terminals a unique spreading code, the unique spreading code having a chipping rate less than a chipping rate of the first pseudorandom noise code, the spreading code being one of an orthogonal spreading code or a near-orthogonal spreading code.

* * * * *

UNITED STATES PATENT AND TRADEMARK OFFICE
CERTIFICATE OF CORRECTION

PATENT NO. : 7,529,264 B2  Page 1 of 1
APPLICATION NO. : 11/152858
DATED : May 5, 2009
INVENTOR(S) : Proctor, Jr. et al.

It is certified that error appears in the above-identified patent and that said Letters Patent is hereby corrected as shown below:

ON THE TITLE PAGE

Item (56), U.S. PATENT DOCUMENTS, page 2, left column, after the line beginning with "6,456,612" insert --6,459,694 10/2002 Sari et al.--.

At column 1, line 54, after the word "than" delete "a".

At column 2, line 62, after the word "can" insert --be--.

At column 3, line 18, before the word "different" delete "of".

At column 10, line 29, after the word "discussed," delete "an".

At column 10, delete lines 34, 35 & 36, and insert therefor --how to set a modulation rate and which of multiple FEC codes shall be used for transmitting over a particular channel.--.

At claim 1, column 10, line 39, after "cation" insert --comprising--.

Signed and Sealed this

Ninth Day of February, 2010

David J. Kappos
*Director of the United States Patent and Trademark Office*